A. M. DORMAN.
POWER CONVEYANCE.
APPLICATION FILED OCT. 12, 1917.
1,364,085.
Patented Jan. 4, 1921.
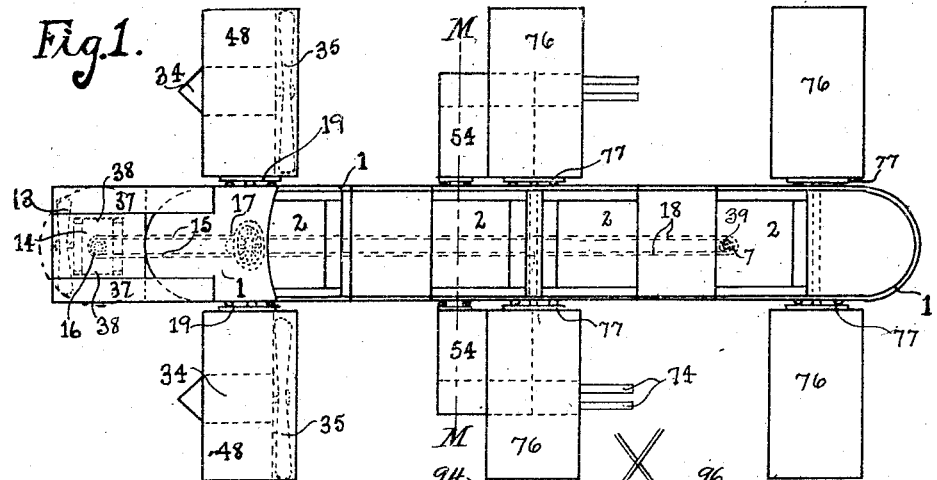
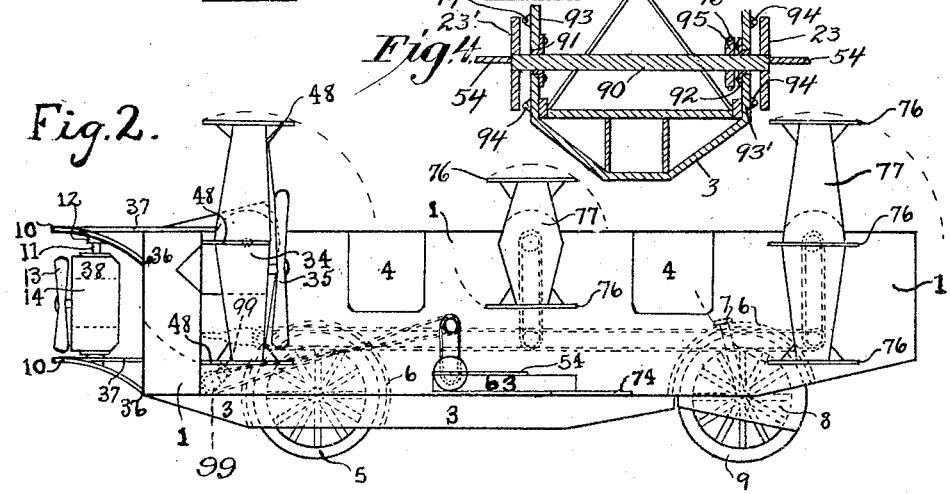
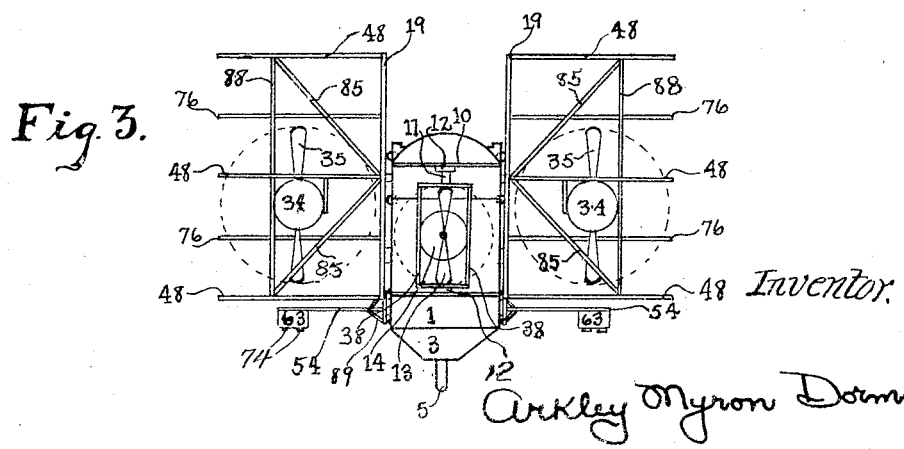
Inventor.
Arkley Myron Dorman

UNITED STATES PATENT OFFICE.

ARKLEY MYRON DORMAN, OF CAMPO, COLORADO.

POWER CONVEYANCE.

1,364,085.  Specification of Letters Patent.  Patented Jan. 4, 1921.

Application filed October 12, 1917. Serial No. 196,300.

*To all whom it may concern:*

Be it known that I, ARKLEY MYRON DORMAN, a citizen of the United States, residing at Campo, in the county of Baca and State of Colorado, have invented certain new and useful Improvements in Power Conveyances, of which the following is a specification.

My invention relates to all power conveyances which travel upon the surface of land, ice, or water, and particularly to those conveyances which travel upon centrally placed wheels, runners or pontoons, used singly or in series longitudinally, (such as the wheels of a motor cycle or monorail).

The objects of my invention are: first:— to provide mechanical means for laterally balancing power conveyances while stationary, starting, or stopping, said conveyances having centrally placed wheels, runners, or pontoons used singly or in series longitudinally; second;—to provide a form of construction for power conveyances that will permit them to travel upon land, ice, or water without change in construction.

My invention is illustrated by the accompanying drawing. It is understood that the drawings are merely for illustration and that various changes may be made in the form, proportions, size and minor details without departing from the spirit or sacrificing any of the advantages of the invention as claimed.

In the drawings Figure 1 is a plan view, Fig. 2 is a side view and Fig. 3 is a front view of a conveyance embodying the features of my invention. Fig. 4 is an enlarged detail view in section taken along the line $m$—$m'$ in Fig. 1.

Similar numerals refer to similar parts throughout the several views.

In the drawings is shown a body, 1, having rounded ends and a pontoon shaped bottom, 3, with ends and sides sloping downwardly and inwardly. This body is watertight with the exception of the door, 4. A suitable seat, 2, is shown just behind the door, 4.

Wheels, 5, and 9, are partially incased in the bottom of the body, housings, 6, surrounding the wheels, 5, and 9, respectively. The rear wheel, 9, is shown turnable to the right or left for the purpose of steering the conveyance, the axle of the wheel being attached to a fork, 7, (similar to the fork of a bicycle). The axle at the upper part of the fork passes through a bearing in the housing, 6, and has a wheel, 39, attached to its upper end. A flexible cable, 18, connects the wheel 39, with a similar wheel attached to the bottom of a steering wheel, 17, in a suitable manner for steering the conveyance when traveling upon land. A rudder, 8, is fixed to the axle of the wheel, 9, to turn with the turning of the wheel thus serving to steer the conveyance when traveling upon water.

Any suitable means may be used for propelling the conveyance but I prefer the use of air propellers, 35, together with their actuating motors, 34. Short airplanes, 48, and 76, are shown pivotally attached to the body framework. These planes may or may not be used but render service in protecting the air propellers and in taking a portion of the weight of the conveyance from the wheels or pontoon bottom as well as in supporting the motors and propellers. They may also be used in holding the conveyance down upon the surface over which it is traveling, in case of wind, by suitable adjustment of their angles of incidence. Struts 19, 85, 88 and 77 brace them.

Means for laterally balancing the conveyance upon its wheels or pontoon bottom when stationary, starting, or stopping, is shown as follows:—A suitable axle, 90, (note Fig. 4), suitably placed in relation to the center of mass of the conveyance, passes through the body of the conveyance near the bottom and is rotatable in suitable bearings, 91, and 92, which are suitably attached to portions of the body framework, 93, and 93', respectively.

Attached to the axle, 90, to each of its ends on the opposite sides of the conveyance are suitable balancing arms, 63, extending rearwardly from said axle. Any suitable means of attachment may be used but the arms are shown attached to the axle by means of airplanes, 54. The arms shown are small pontoons and are fastened to the under side of the airplanes, 54. On the underside of each of the arms, 63, and extending rearwardly therefrom are shown suitable springs, 74. It can readily be seen that by the proper rotation of the axle, 90, the rear ends of the balancing arm springs can be raised from or be lowered upon the surface over which the conveyance is traveling, or upon which it is resting.

The airplanes, 54, are shown attached to disks, 23, and 23' respectively, and the disks are attached to each end of the axle, 90, outside the body of the conveyance. Suitable ball bearings, 94, are shown between the disks and the sides of the body of the conveyance. The bearings, 94, brace and strengthen the connection of the airplanes, the disks, and the axis, 90.

Any suitable means for controlling the rotation of the axis, 90, may be used. I prefer a suitable connection of the axis with a foot lever shown by dotted lines in Fig. 2 at 99. I prefer a wheel, 95, fastened to the axle, 90, in a suitable manner, the wheel, 95, connected to the footlever 99 by a flexible cable, 96. A ratchet arrangement whereby the foot lever may be held stationary at various positions may be used.

Small airplanes, 10, may be used rigidly attached to the front of the body framework at 36, by suitable struts, 37. Between the planes, 10, a small propeller, 13, and its actuating motor, 14, may be pivotally attached, as by an axle, 11, rotatable in bearings 12 attached to the planes, 10. On either side of the motor, 14, may be fastened small air rudders, 38. The propeller, 13, and air rudder, 38, may thus serve to assist in steering the conveyance by suitable attachment of the axle, 11, to a wheel 16, turnable by a suitable cable, 15, attached to the steering wheel, 17.

It can readily be seen that by the manipulation of the foot lever the balancing arms could be made to rest upon, or be raised from the surface upon which the conveyance might happen to be, and that the lowering of the arms upon said surface would serve to balance the conveyance while stationary, stopping, or starting. The springs, 74, serve to absorb shock and vibration in passing over rough and uneven surfaces when the balancing arms are lowered.

It can also be readily seen that such a conveyance is capable of travel upon the surface of land, ice, or water without change in construction.

What I claim and desire to secure by Letters Patent is:

1. In a power conveyance means for laterally balancing the conveyance, while stationary stopping or starting, comprising,—suitable balancing arms pivotally attached in suitable location on each side of the conveyance, said arms extending rearwardly from said attachments in such a manner that the rotation of the pivotal attachments will turn said arms downward and backward to rest upon or upward and backward to raise said arms from the surface over which the conveyance is traveling, and means for changing or holding the position of said arms upon said pivotal attachments.

2. In a power conveyance means for laterally balancing the conveyance while stationary starting or stopping comprising,—suitable balancing arms pivotally attached in suitable location on each side of the conveyance, said arms attached to the conveyance by being attached to suitable airplanes, said airplanes pivotally attached to the conveyance, said arms extending rearwardly from said planes, and means for rotating or holding said planes in their position upon said pivotal attachments.

3. In a power conveyance means for laterally balancing the conveyance while stationary starting or stopping, comprising,—suitable balancing arms pivotally attached in suitable location on each side of the conveyance, said arms extending rearwardly from said attachments, suitable metal springs attached to the rear of said arms and extending rearwardly therefrom, and suitable means for turning or holding said arms in their position upon said pivotal attachments.

4. In a power conveyance means for laterally balancing the conveyance while stationary starting or stopping comprising,—balancing arms pivotally attached in suitable location on each side of the conveyance, said arms extending rearwardly from said attachments, said arms each consisting of a suitable pontoon, and suitable means for turning or holding said pontoons in their position upon said pivotal attachment.

5. In a power conveyance means for lateraly balancing the conveyance while stationary starting or stopping, comprising,—suitable balancing arms suitably attached to axes on each side of the conveyance, said axes rotatable in suitable bearings attached to the body of the conveyance, and suitable means for turning or holding said axes in their rotation in said bearings.

6. In a power conveyance as claimed in claim 5,—a foot lever connected to said axes by a flexible cable in a manner suitable for turning or holding said axes.

7. In a power conveyance having balancing arms pivotally attached on each side of the conveyance,—said arms attached to circular disks, the circular disks pivotally attached to the body of the conveyance, ball bearings between the disks and a suitable plate attached to the body framework of the conveyance, and suitable means for turning or holding the disks upon their pivotal attachments.

8. A power conveyance having an elongated body with square sides and rounded ends substantially as shown, said body water-tight with the exception of the doors, and having a bottom with front sloping downwardly and rearwardly and sides sloping downwardly and inwardly substantially as shown, suitable wheels incased in the bottom of said body, said wheels separated from the inside of said body by suitable waterproof housings and extending a suitable distance below the bottom of said body, said wheels placed in said body centrally from the sides of the body and in suitable spaced relation in longitudinal series, and suitable means for turning one of the said wheels to the right or left in a manner to assist in steering the conveyance.

ARKLEY MYRON DORMAN.